2,763,689

STABILIZED AROMATIC AMINES

Adrian L. Linch, Wilmington, Del., assignor to E. I. du Pont de Nemours and Company, Wilmington, Del., a corporation of Delaware No Drawing. Application December 20, 1951,
Serial No. 262,680

10 Claims. (Cl. 260—578)

This invention relates to aromatic amines which have been stabilized against atmospheric oxidation, particularly by having incorporated therein small proportions of a new class of anti-oxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. For example para-toluidine oxidizes in to a deep red color in 2 to 3 days when stored in the liquid state at 60° C. to 80° C. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 10%.

In industrial practice, the close scheduling of the production of the amines with the processes in which the amines are consumed has become increasingly less practical. The storage of amines, which deteriorates so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

A. E. Robertson, in Patent No. 2,434,651, proposes to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility. He also suggests that the reaction products of alcohols and carbon disulfide, such as isopropyl xanthic acid and its sodium salt, are equivalents of the carbon disulfide and may be used in place thereof. However, the xanthic acids are very unstable and decompose rapidly at atmospheric temperatures. The sodium salt of isopropyl xanthic acid (sodium isopropyl xanthate) is a secondary alkyl xanthate, having the formula

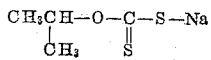

and is not as effective as is desired in some aromatic amines.

It has also been proposed to stabilize certain aromatic amines with aromatic mercaptans. However, such aromatic mercaptans are not particularly effective and, after a short period, invert to pro-oxygenic catalysts. Also, some of such aromatic mercaptans are inoperative with some amines and actually increase the susceptibility of such amines to atmospheric oxidation.

It is an object of my invention to provide a class of aromatic amines containing a new class of compounds which are effective to inhibit oxidation of the amines and which do not invert to pro-oxygenic catalysts. Another object is to provide a class of aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method for stabilizing a specific class of aromatic amines. Further objects are to provide new compositions of matter and to advance the art. Still other objects will appear hereinafter.

The above and other objects may be accomplished in accordance with my invention which comprises incorporating in an aromatic amine of the formula R—$NH_2$, wherein R is a naphthyl radical or a phenyl radical containing 1 to 2 substituent groups selected from $NH_2$, alkyl groups of 1 to 4 carbons atoms, and alkoxy groups of 1 to 4 carbons atoms, from about 0.01% to about 0.5% of an alkali metal primary alkyl xanthate in which the alkali metal has an atomic weight between 22 and 40 and the alkyl group contains from 3 to 5 carbon atoms.

I have found that such xanthates are efficient anti-oxidants for such aromatic amines. They effectively inhibit oxidation of such aromatic amines and prevent loss of the amine by oxidation, reduce contamination of the amine by oxidation products and avoid the synergistic action of the oxidation products in subsequent chemical processes in which the amines are employed. The resulting stabilized aromatic amines may be stored for relatively long periods of time, thereby obviating the necessity for close scheduling of the amine production with the process in which the amine is consumed and usually making costly purification processes unnecessary. Such xanthates are also effective to protect the amines in the processes by which they are manufactured so that higher yields of amine of better quality can be obtained. Generally, such xanthates are superior to the sodium isopropyl xanthate suggested in Patent No. 2,434,651 and, in many cases, greatly superior thereto. It was particularly surprising to find that sodium n-propyl xanthate is far superior to the sodium isopropyl xanthate in several amines.

The aromatic amines, which can be effectively stabilized in accordance with this invention, are those of the formula R—$NH_2$ wherein R is a naphthyl radical or a phenyl radical containing 1 to 2 substituent groups selected from $NH_2$, alkyl groups of 1 to 4 carbon atoms, and alkoxy groups of 1 to 4 carbon atoms. It will be understood that I employ the terms "naphthyl radical" and "phenyl radical" in their most restricted sense to mean the simple radicals, unsubstituted except to the extent specifically indicated, in which the free valence belongs to a carbon of a benzene ring, and that each specified substituent group is directly bonded to a carbon atom of a benzene ring. My invention is particularly adapted for the stabilization of unsubstituted naphthyl-amines and phenyl amines containing an alkyl group of 1 to 4 carbon atoms and, preferably, of alpha-naphthyl-amine and the toluidines. Other representative aromatic amines are the phenylene diamines, the toluylene diamines, the antisidines, the phenetidines, and the methyl ethers of amino cresols.

The xanthates, which are effective as anti-oxidants for the aromatic amines, are the alkali metal primary alkyl xanthates in which the alkali metal has an atomic weight between 22 and 40 and the alkyl group contains from 3 to 5 carbon atoms. They may be represented by the formula:

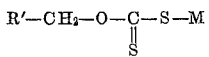

wherein M is sodium or potassium and R' is an alkyl group of 2 to 4 carbon atoms which may be a branched chain or a straight chain. Preferably, the xanthates are primary normal alkyl xanthates; i. e. R' is a straight chain. Also, preferably, the alkali metal (M in the formula) is sodium. For the stabilization of most of the aromatic amines, sodium n-propyl xanthate is the most effective and cheapest, and will be preferred. Usually, the xanthates will be employed in their anhydrous form, but, frequently, a particular xanthate is most readily available in the form of its monohydrate or its dihydrate, and it may be used in such hydrated form, if desired. The formulas of representative sodium primary alkyl xanthates are given below for illustrative purposes.

Sodium n-propyl xanthate

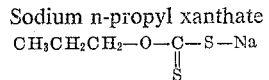

Sodium n-butyl xanthate

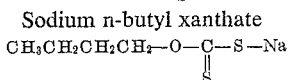

Sodium 2-methyl-propyl xanthate

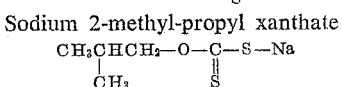

Sodium n-amyl xanthate

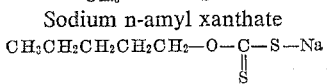

Sodium 3-methyl-butyl xanthate

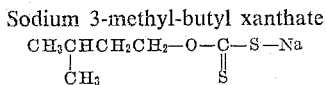

The concentration of the anti-oxidant in the amine should be from about 0.01% to about 0.5% by weight, preferably, from about 0.05% to about 0.3%, and usually about 0.1%. While the anti-oxidants of my invention may be effective in concentrations above 0.5%, such higher concentrations will generally be objectionable as they would contaminate the amine to an undesirable extent. Also, concentrations below 0.01% of anti-oxidant will usually show some effect, but such effect will generally be insufficient for practical purposes.

Not all of the anti-oxidants (xanthates) of my invention are equally effective for all of the aromatic amines of my invention. Accordingly, the particular anti-oxidant and the concentration employed for each of the aromatic amines will be chosen in accord with the degree of stability desired. Also, the choice of anti-oxidant and the concentration thereof will be governed by the conditions to which the aromatic amine will be exposed, such as light, temperature and atmospheric contact. Light acts as a catalyst for the oxidation of the aromatic amines and hence, if the amine is to be exposed to light for any substantial period of time, it will be necessary to materially increase the concentration of the anti-oxidant. Furthermore, the rate of oxidation of the aromatic amine increases with increase in temperature, so that the concentration of the anti-oxidant should be increased when the amine is to be subjected to temperatures above atmospheric. Furthermore, the rate of oxidation of the aromatic amine varies with variation in the extent of its exposure to air or oxygen and higher concentrations of anti-oxidant will be required when the amine is to be exposed to air to any material extent. Therefore, it will be understood that the anti-oxidants exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the xanthate to the aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the anti-oxidant. However, the application of my invention is not restricted to freshly prepared amines, as the anti-oxidant may be added to an aromatic amine which has been partially oxidized, and the anti-oxidant will effectively retard further oxidation of the amine. Also, the anti-oxidants may be added during the manufacture of the amine to avoid atmospheric oxidation during such manufacture, to thereby obtain the amine in higher yields and better quality. In particular, the anti-oxidant may be added to the crude amine, before purification of the amine by crystallization, to thereby inhibit oxidation of the amine during the drying operation.

If the aromatic amine is liquid at normal temperatures, the anti-oxidant may be simply added thereto in the desired concentration and dissolved therein. If the amine is a solid at atmospheric temperatures, it may be melted or dissolved in an inert solvent and the anti-oxidant added to the melted amine or to the solution. Also, if the anti-oxidant is not soluble in the aromatic amine to the extent desired, it may be added as a solution in a suitable solvent, such as ethanol, isopropyl alcohol and ether. The xanthates effectively stabilize the aromatic amines in the presence of inert solvents and diluents.

Examples are given hereinafter, illustrating the effect of representative xanthates of my invention in stabilizing representative aromatic amines, some of such examples including tests with other xanthates for purposes of comparison. The tests with liquid aromatic amines were carried out in clear glass bottles filled to approximately 75% of their capacity with the amine or stabilized amine and exposed to diffused daylight at room temperature. The bottles were capped but not sealed airtight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of the aromatic amines, has disclosed a certain amount of specificity in the chain of reactions. Whereas, certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (Central Maximum=410 mu), green (525 mu) and red (610 mu) filters and no filter. Distilled water was used as the reference standard, and the density expressed as percent transmission. Experience has shown that the use of aromatic amines, darker than a red-amber color, do not produce satisfactory results in chemical processes. Therefore, when oxidation has progressed to an extent sufficient to reduce the total light transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes the small variations in oxidation susceptibility exhibited by individual production lots of most amines.

Evaluation of those amines, which are normally solid at room temperature, was carried out somewhat differently. The anti-oxidant was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no anti-oxidant, was tested at the same time, personal variations in judgment of color depth largely canceled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine may be calculated by dividing the index of the stabilized amine by the index of the unstabilized amine (Control Index). This ratio is the "Stability Ratio." This Stability Ratio expresses the relation of the storage life of the stabilized amine to the storage life of the unstabilized amine under the same conditions. For example, a Stability Ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

EXAMPLE I

*Ortho-toluidine*

The amine to be stabilized was a commercial grade of ortho-toluidine which distilled from 5 cc. to 95 cc. over a range of 1.0° C. including 200.2° C., contained not less than 99.0% total toluidine by diazotization, and was completely soluble in 10% hydrochloric acid. The ortho-toluidine was redistilled at 20 mm. pressure to separate it from colored non-volatile impurities and to obtain a colorless product. The tests were conducted at atmospheric temperature. Control index (Unstabilized o-Toluidine=210.

| Anti-oxidant | Concentration, Percent | Anti-oxidant Index |
|---|---|---|
| 1. Sodium n-propyl xanthate (dihydrate) | 0.1 | 340 |
| 2. Sodium n-propyl xanthate | 0.1 | 226 |
| 3. Potassium n-propyl xanthate | 0.1 | 120 |
| 4. Potassium n-butyl xanthate | 0.1 | 310 |
| 5. Potassium 2-methyl-propyl xanthate | 0.1 | 440 |
| 6. Potassium n-amyl xanthate | 0.1 | 310 |
| 7. Potassium 3-methyl-butyl xanthate | 0.1 | 140 |
| 8. Sodium isopropyl xanthate (dihydrate) | 0.1 | 0 |
| 9. Potassium isopropyl xanthate | 0.1 | 60 |

EXAMPLE II

*Para-toluidine*

Different production lots of para-toluidine were distilled under reduced pressure to obtain water-white products for testing, and tested at 70° C. in open bottles in an air oven in order to simulate industrial plant storage conditions. The unstabilized para-toluidine had a control index of 8.

| Anti-oxidant | Concentration, Percent | Anti-oxidant Index |
|---|---|---|
| 1. Sodium n-propyl xanthate (dihydrate) | 0.1 | 116 |
| 2. Sodium n-propyl xanthate (at 60° C.) | 0.1 | 112 |
| 3. Sodium n-butyl xanthate (dihydrate) | 0.1 | 48 |
| 4. Sodium 3-methyl-butyl xanthate (monohydrate) | 0.1 | 48 |
| 5. Potassium n-propyl xanthate | 0.1 | 44 |
| 6. Potassium n-butyl xanthate | 0.1 | 48 |
| 7. Potassium 2-methyl-propyl xanthate | 0.1 | 36 |
| 8. Potassium n-amyl xanthate | 0.1 | 40 |
| 9. Potassium 3-methyl-butyl xanthate | 0.1 | 48 |
| 10. Sodium isopropyl xanthate (dihydrate) | 0.1 | 40 |

EXAMPLE III

*Meta-toluidine*

A commercial grade of meta-toluidine was redistilled to obtain a water-white product for stability evaluation. The following table summarizes the results obtained from stability tests made in bottles at room temperature. The unstabilized meta-toluidine had a control index of 166.

| Anti-oxidant | Concentration, Percent | Anti-oxidant Index |
|---|---|---|
| 1. Potassium n-propyl xanthate | 0.1 | 270 |
| 2. Sodium n-propyl xanthate (dihydrate) | 0.1 | 106 |
| 3. Sodium isopropyl xanthate (dihydrate) | 0.1 | 24 |
| 4. Potassium n-butyl xanthate | 0.1 | 180 |
| 5. Sodium n-butyl xanthate (dihydrate) | 0.1 | 130 |
| 6. Potassium 2-methyl-propyl xanthate | 0.1 | 82 |
| 7. Potassium n-amyl xanthate | 0.1 | 98 |
| 8. Sodium n-amyl xanthate (dihydrate) | 0.1 | 182 |

EXAMPLE IV

*Alpha-naphthylamine*

Several batches of alpha-naphthylamine which crystallized at 46.0° C. to 46.1° C. (by maximum rise method) and contained 4.6% to 4.4% of beta-isomer were redistilled at 1–2 mm. pressure to obtain a colorless distillate which froze to a white crystalline solid on cooling. The oxidative decomposition rates were determined in an air oven at 70° C., in open glass bottles to simulate industrial plant storage conditions. The extent of decomposition was estimated by visual examination. The control index of unstabilized alpha-naphthylamine was 4.

| Anti-oxidant | Concentration, Percent | Anti-oxidant Index |
|---|---|---|
| 1. Sodium n-propyl xanthate (dihydrate) | 0.2 | 48 |
| 2. Sodium n-propyl xanthate | 0.2 | 44 |
| 3. Sodium n-butyl xanthate (dihydrate) | 0.2 | 76 |
| 4. Sodium n-amyl xanthate (dihydrate) | 0.2 | 76 |
| 5. Sodium 3-methyl-butyl xanthate (monohydrate) | 0.2 | 36 |
| 6. Potassium n-propyl xanthate | 0.2 | 48 |
| 7. Potassium n-butyl xanthate | 0.2 | 32 |
| 8. Potassium 2-methyl-propyl xanthate | 0.2 | 24 |
| 9. Potassium n-amyl xanthate | 0.2 | 20 |
| 10. Potassium 3-methyl-butyl xanthate | 0.2 | 36 |
| 11. Sodium isopropyl xanthate (dihydrate) | 0.2 | 40 |
| 12. Potassium isopropyl xanthate | 0.2 | 20 |

EXAMPLE V

*Meta-phenylene diamine*

A sample of meta-phenylene diamine was distilled at 2–3 mm. pressure, and the distillate crystallized at about 62 to 63° C. The xanthate was dissolved in the molten amine and the samples were stored in open clear glass bottles at 70° C. The control index of unstabilized metaphenylene diamine was 4.

| Anti-oxidant | Concentration, Percent | Antioxidant Index |
|---|---|---|
| 1. Sodium n-propyl xanthate | 0.1 | 28 |
| 2. Potassium n-propyl xanthate | 0.1 | 24 |
| 3. Potassium n-butyl xanthate | 0.1 | 28 |
| 4. Potassium 2-methyl-propyl xanthate | 0.1 | 24 |
| 5. Potassium n-amyl xanthate | 0.1 | 24 |

EXAMPLE VI

2,4-toluylene diamine

Following the procedure of Example V, 2,4-toluylene diamine was stabilized by use of three xanthates as shown below. The amine was redistilled at 3 mm., the 125–130° C. cut being collected for use in the tests. This cut had a crystallizing point of 97.5° C. The control index of the unstabilized amine was 12.

| Anti-oxidant | Concentration, Percent | Antioxidant Index |
|---|---|---|
| 1. Sodium n-propyl xanthate (monohydrate) | 0.1 | 120+ |
| 2. Potassium n-butyl xanthate (anhydrous) | 0.1 | 120+ |
| 3. Sodium n-butyl xanthate (monohydrate) | 0.1 | 100 |

The plus values in this Example VI mean that the tests were discontinued at such time and before the oxidation had progressed to the point where the amine was unsuitable for use.

EXAMPLE VII

Ortho anisidine

Ortho anisidine was distilled at a pressure of 10 mm. at 101–104° C. to obtain a colorless product with a control index of 30. The following tests were conducted at room temperature:

| Anti-oxidant | Concentration, Percent | Antioxidant Index |
|---|---|---|
| 1. Potassium n-propyl xanthate | 0.1 | 24 |
| 2. Sodium n-propyl xanthate | 0.1 | 180 |
| 3. Sodium n-propyl xanthate (dihydrate) | 0.14 | 180 |
| 4. Sodium isopropyl xanthate | 0.1 | 172 |
| 5. Sodium n-butyl xanthate (monohydrate) | 0.12 | 180 |
| 6. Sodium n-butyl xanthate (dihydrate) | 0.1 | 180 |
| 7. Potassium 2-methyl-propyl xanthate | 0.1 | 172 |

EXAMPLE VIII

Para anisidine

Para anisidine was distilled at 3–4 mm. and 103–104° C. giving a pale yellow crystalline product melting at 56.2° C. The control index was 4. The following tests were carried out at 70° C.:

| Anti-oxidant | Concentration, Percent | Antioxidant Index |
|---|---|---|
| 1. Potassium n-propyl xanthate | 0.1 | 16 |
| 2. Sodium n-propyl xanthate | 0.1 | 12 |

EXAMPLE IX

2-methoxy-5-methyl aniline

The above compound, cresidine, was distilled at 8 mm. and 113–114° C. forming an almost colorless product with a control index of 8. The following tests were carried out at 70° C.:

| Anti-oxidant | Concentration, Percent | Antioxidant Index |
|---|---|---|
| 1. Potassium n-propyl xanthate | 0.1 | 8 |
| 2. Sodium n-propyl xanthate | 0.1 | 8 |

EXAMPLE X

Ortho phenetidine

The ortho phenetidine was distilled at 10 mm. and 104° C. and was a colorless liquid with a control index of 16. The following tests were carried out at room temperature:

| Anti-oxidant | Concentration, Percent | Antioxidant Index |
|---|---|---|
| 1. Potassium n-propyl xanthate | 0.1 | 60 |
| 2. Sodium n-propyl xanthate | 0.1 | 72 |
| 3. Sodium n-propyl xanthate (dihydrate) | 0.14 | 60 |
| 4. Sodium isopropyl xanthate | 0.14 | 20 |
| 5. Sodium n-butyl xanthate | 0.14 | 88 |

EXAMPLE XI

Para phenetidine

Para phenetidine was obtained as a colorless liquid by distillation at 15 mm. and 125° C. The control index was 20, and the following tests were carried out at room temperature:

| Anti-oxidant | Concentration, Percent | Antioxidant Index |
|---|---|---|
| 1. Potassium n-propyl xanthate | 0.1 | 96 |
| 2. Sodium n-propyl xanthate | 0.05 | 68 |
| | 0.1 | 84 |
| | 0.2 | 96 |
| 3. Sodium n-propyl xanthate (dihydrate) | 0.14 | 56 |
| 4. Sodium isopropyl xanthate | 0.14 | 24 |
| 5. Potassium n-butyl xanthate | 0.1 | 96 |
| 6. Sodium n-butyl xanthate | 0.1 | 108 |
| 7. Sodium n-butyl xanthate (monohydrate) | 0.12 | 60 |
| 8. Sodium n-butyl xanthate (dihydrate) | 0.14 | 84 |
| 9. Potassium 2-methyl-propyl xanthate | 0.1 | 84 |
| 10. Potassium n-amyl xanthate | 0.1 | 24 |
| 11. Sodium n-amyl xanthate (dihydrate) | 0.1 | 24 |
| 12. Potassium 3-methyl-butyl xanthate | 0.1 | 20 |

Para-phenetidine was evaluated by an accelerated test, which differs from the one used for all of the other evaluations in that samples were stored at a constant pressure and volume of pure oxygen. Also, the effect of the stabilizer was measured in terms of % purity of the amine, by diazotization and coupling to metasulfophenyl methylpyrazolone. The test was conducted at 70±1° C. for 42 days, using 0.1% sodium n-propyl xanthate in p-phenetidine. At the end of the storage period, it was found that the purity of the unstabilized p-phenetidine had decreased from 99.7±0.3% to 92%, whereas the value for the stabilized sample was 97.5%.

An additional observation was that the anti-oxidant effect of the inhibitor is not limited to the repression of color formation, but continues to retard oxidation long after the para-phenetidine has become black and opaque to transmitted light. The control sample acquired a dark red color within 3 hours, while 36 hours were required to produce the same depth of color in the stabilized sample.

It will be understood that the preceding examples are given solely for illustrative purposes and that I do not intend to limit my invention to the specific embodiments disclosed therein. It will be apparent to those skilled in the art that other aromatic amines, within the class heretofore disclosed, may be similarly stabilized. It will also be apparent that other xanthates, within the class hereinbefore defined, and mixtures of any two or more thereof may be substituted for those of the examples. It will be further apparent that the concentration of the antioxidant in the aromatic amine may also be varied within the limits disclosed. Still further, the stabilized amine may be diluted with inert solvents or with inert liquid or solid diluents.

It will be apparent that, by my invention, I am able to provide a class of aromatic amines which are effectively stabilized against oxidation for relatively long periods of time. Thereby, the amines may be stored without material loss in amine or contamination of the amine with deleterious oxidation products and it is unnecessary to schedule the production of the aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the formula R—NH₂ wherein R is a monoalkoxy substituted phenyl radical in which the alkoxy group contains 1 to 2 carbon atoms, and from about 0.01% to about 0.5% of an alkali metal primary normal alkyl xanthate in which the alkali metal has an atomic weight between 22 and 40 and the alkyl group contains from 3 to 4 carbon atoms.

2. A composition consisting essentially of orthoanisidine and from about 0.01% to about 0.5% of an alkali metal primary alkyl xanthate in which the alkali metal has an atomic weight between 22 and 40 and the alkyl group contains from 3 to 4 carbon atoms.

3. A composition consisting essentially of orthoanisidine and from about 0.01% to about 0.5% of a sodium primary normal alkyl xanthate in which the alkyl group contains from 3 to 4 carbon atoms.

4. A composition consisting essentially of orthoanisidine and from about 0.01% to about 0.5% of sodium n-propyl xanthate.

5. A composition consisting essentially of paraanisidine and from about 0.01% to about 0.5% of an alkali metal n-propyl xanthate in which the alkali metal has an atomic weight between 22 and 40.

6. A composition consisting essentially of paraanisidine and from about 0.01% to about 0.5% of potassium n-propyl xanthate.

7. A composition consisting essentially of an aromatic amine of the formula R—NH₂ wherein R is a monoethoxy substituted phenyl radical, and from about 0.01% to about 0.5% of an alkali metal primary normal alkyl xanthate in which the alkali metal has an atomic weight between 22 and 40 and the alkly group contains from 3 to 4 carbon atoms.

8. A composition consisting essentially of an aromatic amine of the formula R—NH₂ wherein R is a monoethoxy substituted phenyl radical, and from about 0.01% to about 0.5% of sodium n-butyl xanthate.

9. A composition consisting essentially of paraphenetidine and from about 0.01% to about 0.5% of an alkali metal primary alkyl xanthate in which the alkali metal has an atomic weight between 22 and 40 and the alkyl group contains from 3 to 4 carbon atoms.

10. A composition consisting essentially of paraphenetidine and from about 0.01% to about 0.5% of sodium n-butyl xanthate.

References Cited in the file of this patent

UNITED STATES PATENTS 2,434,651     Robertson _____ Jan. 20, 1948

OTHER REFERENCES

Chem. Abst., vol. 42, p. 2281ʰ.